(12) United States Patent
Betting et al.

(10) Patent No.: US 9,500,404 B2
(45) Date of Patent: Nov. 22, 2016

(54) METHOD AND SYSTEM FOR REMOVING $H_2S$ FROM A NATURAL GAS STREAM

(75) Inventors: Marco Betting, Woerde (NL); Cornelis Antonie Tjeenk Willink, Wassenaar (NL);
(Continued)

(73) Assignee: TWISTER B.V., Rijswijk (NL)

( * ) Notice: Subject to any disclaimer, the term of this patent is extended or adjusted under 35 U.S.C. 154(b) by 1612 days.

(21) Appl. No.: 12/670,333

(22) PCT Filed: Jun. 27, 2008

(86) PCT No.: PCT/NL2008/050424
§ 371 (c)(1),
(2), (4) Date: Oct. 27, 2010

(87) PCT Pub. No.: WO2009/002174
PCT Pub. Date: Dec. 31, 2008

(65) Prior Publication Data
US 2011/0036122 A1    Feb. 17, 2011

(30) Foreign Application Priority Data

Jun. 27, 2007  (EP) ...................................... 07111145

(51) Int. Cl.
*F25J 3/02* (2006.01)
*B01D 53/52* (2006.01)
(Continued)

(52) U.S. Cl.
CPC .............. *F25J 3/0209* (2013.01); *B01D 53/24* (2013.01); *B01D 53/52* (2013.01); *C10L 3/10* (2013.01);
(Continued)

(58) Field of Classification Search
CPC .................. F25J 2220/66; F25J 3/0209; F25J 3/0233; F25J 2200/70; F25J 2205/10; B01D 53/52; C10L 3/103
(Continued)

(56) References Cited

U.S. PATENT DOCUMENTS 4,332,596 A * 6/1982 Ranke et al. ...................... 95/8
5,449,440 A * 9/1995 Rescalli ................. B01D 3/146
   203/18
(Continued)

FOREIGN PATENT DOCUMENTS

WO    WO 3029739 A2 *  4/2003 ................. F25J 3/06
WO    2006/032139       3/2006
(Continued)

*Primary Examiner* — John F Pettitt
(74) *Attorney, Agent, or Firm* — Tucker Ellis LLP

(57) ABSTRACT

A method for removing hydrogen sulphide ($H_2S$) from a natural gas stream comprising methane ($CH_4$) and $H_2S$ comprises: —cooling the natural gas stream in a heat exchanger assembly (13,16,18); —feeding at least part of the cooled natural gas stream through a feed conduit (19,21) into a cyclonic expansion and separation device (1) in which the cooled natural gas stream is expanded in a nozzle (4) and thereby further cooled to a temperature and pressure below the dew point of $H_2S$ and is separated by inducing the cooled natural gas stream to swirl in a tubular separation chamber (9) thereby inducing centrifugal forces to separate the cooled natural gas stream into a cooled low density fluid fraction, which is $H_2S$ depleted and methane enriched, and a cooled high density fluid fraction, which is $H_2S$ enriched and methane depleted; —feeding the cooled low density fluid fraction to a product gas conduit (33) which is connected to the heat exchanger assembly (14) for cooling the natural gas stream fed to the cyclonic expansion and separation device (1); and —feeding the cooled high density fluid fraction to a fractionating column (8) for further separation.

10 Claims, 4 Drawing Sheets

(75) Inventors: Robert Petrus Van Bakel, Haarlem (NL)

(51) Int. Cl.
*C10L 3/10* (2006.01)
*B01D 53/24* (2006.01)

(52) U.S. Cl.
CPC .............. *C10L 3/102* (2013.01); *C10L 3/103* (2013.01); *F25J 3/0233* (2013.01); *B01D 2257/304* (2013.01); *B01D 2258/06* (2013.01); *F25J 2200/70* (2013.01); *F25J 2205/10* (2013.01)

(58) Field of Classification Search
USPC .................. 62/617, 618, 620, 623, 632, 633
See application file for complete search history.

(56) References Cited

U.S. PATENT DOCUMENTS

| | | | |
|---|---|---|---|
| 6,372,019 B1* | 4/2002 | Alferov | B04C 3/00 95/29 |
| 6,735,979 B2* | 5/2004 | Lecomte | B01D 53/1462 203/27 |
| 7,121,115 B2* | 10/2006 | Lemaire | C10L 3/102 62/625 |
| 2002/0189443 A1 | 12/2002 | McGuire | |

FOREIGN PATENT DOCUMENTS

| | | |
|---|---|---|
| WO | 2006/087332 | 8/2006 |
| WO | 2006/089948 | 8/2006 |

\* cited by examiner

METHOD AND SYSTEM FOR REMOVING H$_2$S FROM A NATURAL GAS STREAM

The invention relates to a method for removing hydrogen sulphide from a natural gas stream.

Highly sour natural gas streams may contain more than 10 mole % Hydrogen Sulphide (H$_2$S).

Sour natural gas streams are often treated in amine plants with Amine absorption columns. The regenerated gas stream from the amine plant is released at fairly low pressure and needs further treatment using a Claus process to transform the H$_2$S in to elementary sulphur. Especially for H$_2$S rich gas fields (10-90 mole % H$_2$S) Amine plants followed by a Claus process become uneconomical.

Recently process schemes have been developed to effectively pre-treat natural gas streams at low temperature in order to recover and fractionate the low boiling vapours such as C$_2$, C$_3$, C$_4$ and also H$_2$S and CO$_2$. One of these low temperature schemes is published in International patent application WO2006/089948. This prior art reference discloses the use of a cyclonic separator to optimize the thermodynamic performance whilst reducing the size of costly fractionation columns and reflux chillers compared to the traditional low temperature schemes. One of the teachings in this patent publication is that it is thermodynamically more favourable to cool the inlet stream to the cyclonic separator with a chiller than it is to cool the liquid enriched secondary outlet stream of the cyclonic separator with a chiller.

Fractionation columns are well known in the industry. Recently Total (TFE) and Institute Français du Petrole (IFP), have developed an improved fractionation process for low temperature H$_2$S removal process is the so called SPREX process. This SPREX scheme is operating a fractionation column fed with pre-cooled gas at a feed temperature of 25-30° C. The overhead gas—containing predominantly methane and H$_2$S—is cooled down to approx −30° C. with a chilling device. The liquid condensing in the chiller, which predominantly consists of H$_2$S, is fed back to the top tray of the column as reflux. This H$_2$S reflux dissolves the majority of the water entering the column. By using this H$_2$S reflux as desiccant, hydrates can be avoided even when the column top temperature of the fluid is operated at −5° C. at a pressure of ~80 bar. The H$_2$S enriched liquid stream leaving the bottom of the column is thereafter pumped into the gas reservoir, thereby avoiding costly, large scale amine absorption towers and Claus process as well as avoiding operational costs associated with the disposal of huge amounts of elementary sulphur.

The SPREX process is designed as a bulk H$_2$S removal system, hence treatment with Amine absorbers remains necessary. The H$_2$S recovery rate is about 60-70% leaving still substantial amounts of H$_2$S in the produced gas stream (10-25 mole %). A further increase of the H$_2$S recovery would require lower top temperatures hence larger chillers. Unfortunately, the incremental investment saving of the smaller Amine+Claus plant do not outweigh the incremental cost of these increasingly larger chillers.

The method according to the present invention aims to provide a pre-treatment process using a cyclonic separator upstream of a fractionation column, thereby reducing the gas load on the column and meanwhile achieving a lower temperature in the top of the column thereby enhancing H$_2$S recovery and/or the cooling efficiency.

SUMMARY OF THE INVENTION

In accordance with the invention there is provided a method for removing hydrogen sulphide from a natural gas stream comprising methane and hydrogen sulphide, the method comprising:

cooling the natural gas stream in a heat exchanger assembly;

feeding at least part of the cooled natural gas stream through a feed conduit into a cyclonic expansion and separation device in which the cooled natural gas stream is expanded in a nozzle and thereby further cooled to a temperature and pressure below the dewpoint of hydrogen sulphide and is separated by inducing the cooled natural gas stream to swirl in a tubular separation chamber thereby inducing centrifugal forces to separate the cooled natural gas stream into a cooled low density fluid fraction, which is hydrogen sulphide depleted and methane enriched, and a cooled high density fluid fraction which is hydrogen sulphide enriched and methane depleted;

feeding the cooled low density fluid fraction to a product gas conduit which is connected to the heat exchanger for cooling the natural gas stream fed to the cyclonic expansion and separation device; and feeding the cooled high density fluid fraction to a fractionating column for further separation, and wherein the fractionating column is configured to separate the high density fluid fraction discharged by the cyclonic expansion and separation device into a hydrogen sulphide enriched and methane depleted bottom fraction and a hydrogen sulphide depleted and methane enriched upper fraction, which upper fraction is discharged from the upper part of the fractionating column into a reflux conduit in which a reflux refrigerator is arranged and which discharges the cooled upper fraction into a reflux separation vessel in which the cooled upper fraction is separated into:

a) a cooled substantially gaseous hydrogen sulphide depleted and methane enriched fraction, which is mixed with the hydrogen sulphide depleted and methane enriched fluid fraction discharged by the cyclonic expansion and separation device; and b) a cooled hydrogen sulphide enriched and methane depleted substantially liquid fluid fraction, which is re-circulated into the feed conduit.

The feed conduit may comprise a water separation vessel—in which predominantly water and some hydrocarbon liquids—and an inlet refrigerator such that the natural gas stream fed to the cyclonic expansion and separation device has a reduced water content and a temperature between 5 and −25 degrees Celsius.

The heat exchanger assembly may furthermore comprise:

a first heat exchanger in which the natural gas stream is cooled by the cooled low density fluid fraction flowing through the product gas conduit to a temperature below the dew point of said natural gas stream, from which first heat exchanger the cooled natural gas enters the water separation vessel; and a heat second heat exchanger in which the dewatered natural gas stream discharged by the water separation vessel is cooled by the cooled substantially gaseous hydrogen sulphide depleted and methane enriched fraction discharged by the reflux separation vessel.

The feed conduit may also comprise a gas liquid separation vessel, which is arranged between the inlet refrigerator and an inlet of the cyclonic expansion and separation device in which vessel the cooled natural gas stream is separated into a methane enriched and hydrogen sulphide depleted upper fraction which is fed to the cyclonic expansion and separation device and a hydrogen sulphide enriched and methane depleted bottom fraction, which is fed into the fractionating column.

Preferably, the cyclonic expansion and separation device comprises:

a) an assembly of swirl imparting vanes for imposing a swirling motion on the natural gas stream, which vanes are arranged upstream of a nozzle in which the natural gas stream is accelerated to a substantially supersonic velocity and expanded and thereby further cooled such that centrifugal forces separate the swirling fluid stream in the tubular separation chamber, which is arranged downstream of the nozzle, into the low and high density fluid fractions.

The cyclonic expansion and separation device may comprise an assembly of swirl imparting vanes which protrude in an at least partially radial direction from a torpedo shaped central body upstream of the nozzle, which body has a larger outer diameter than the inner diameter of the nozzle, wherein the torpedo shaped body, the assembly of swirl imparting vanes and the nozzle are configured such that the isentropic efficiency of expansion in the nozzle is at least 80%.

Calculations have indicated that application of the method according to the invention will result in significant increase of the $H_2S$ recovery of up to 80%-85% or a reduction of the chiller duty with approximately 50% for a similar $H_2S$ recovery of 60-70%. It is observed that when used in this specification and claims the term 'a natural gas stream comprising methane and hydrogen sulphide' shall mean that the natural gas stream may wholly or partially consist of methane and hydrogen sulphide and that the methane may form any fraction between 0 and 100% by weight, volume or moles of the natural gas stream and that the hydrogen sulphide may form any fraction between 0 and 100% by weight, volume or moles of the natural gas stream.

These and other embodiments, features and advantages of the method according to the invention are disclosed in the accompanying drawings and are described in the accompanying claims, abstract and following detailed description of preferred embodiments of the method according to the invention in which reference is made to the accompanying drawings.

DETAILED DESCRIPTION OF THE DEPICTED EMBODIMENTS

Figure 1:
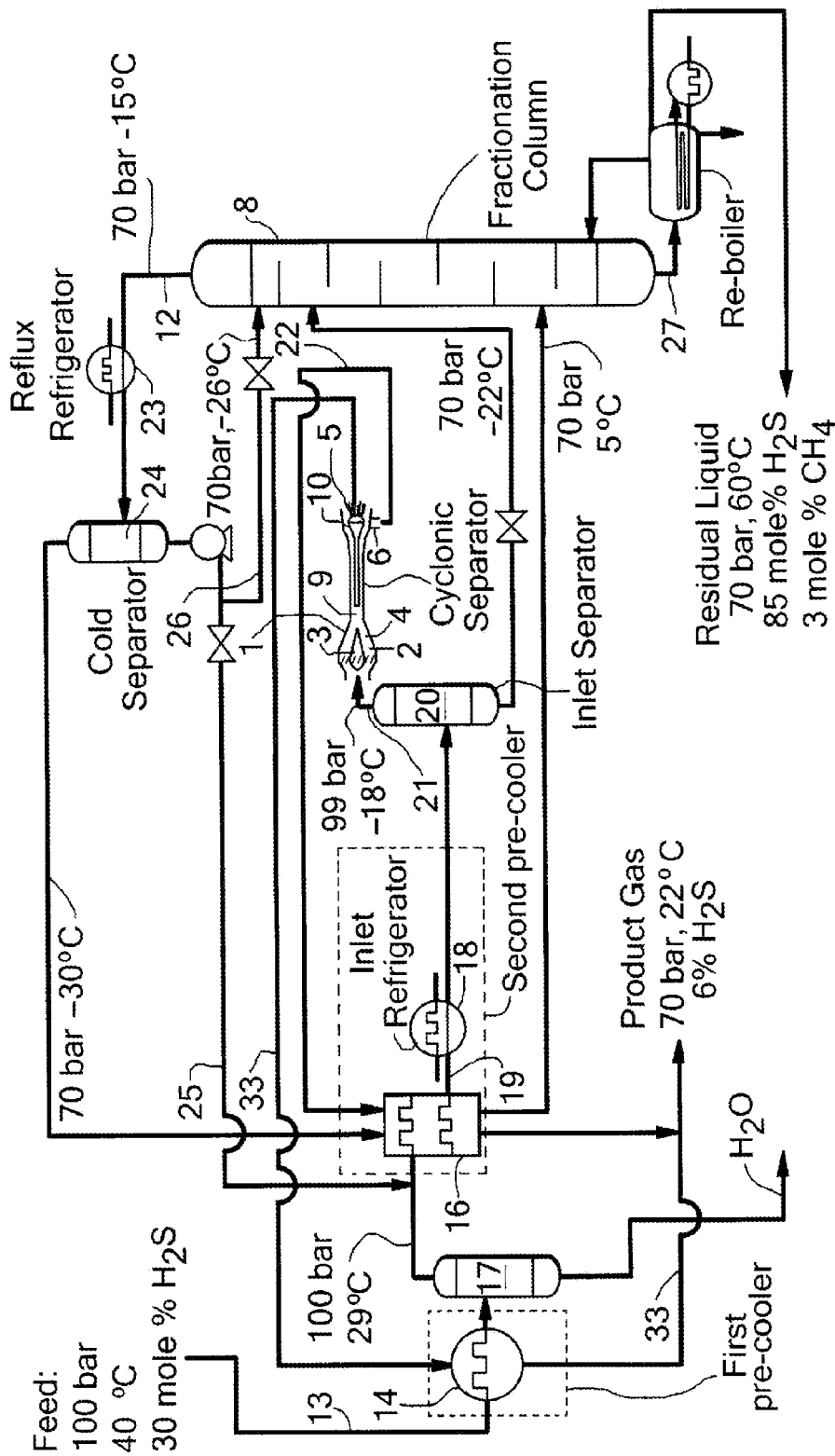
FIG. 1 depicts a flow scheme of a first embodiment of the method according to the invention.
Figure 2:
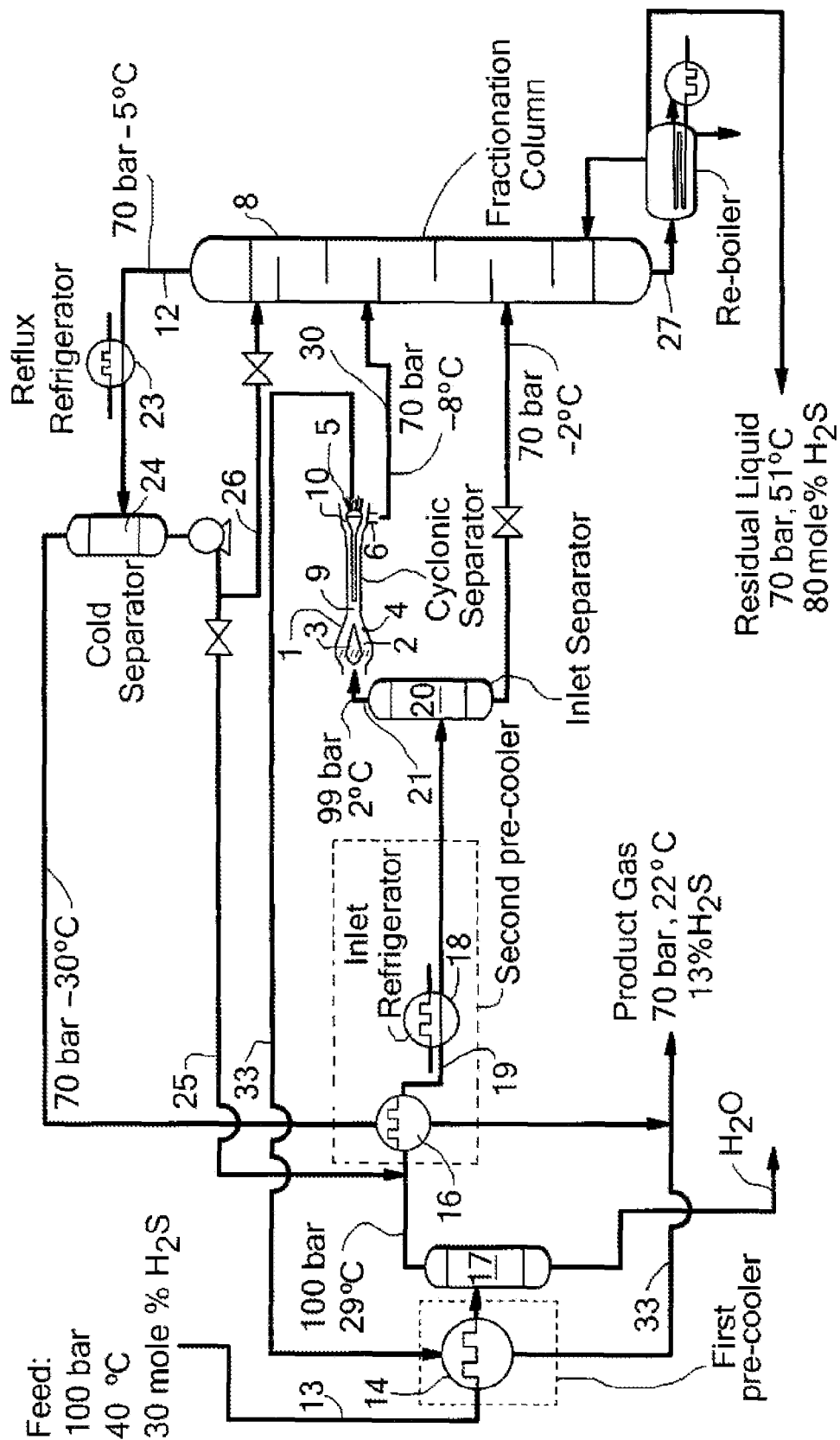
FIG. 2 depicts a flow scheme of a second embodiment of the method according to the invention.

In FIGS. 1 and 2 similar reference numerals are used to identify similar components.

FIGS. 1 and 2 each show a process scheme comprising a cyclonic expansion and separation device 1, which comprises swirl imparting vanes 2 mounted on a torpedo shaped central body 3, a nozzle 4 in which a swirling natural gas stream is accelerated to a transonic or supersonic velocity, a central primary fluid outlet 5 for discharging a methane enriched and methane depleted primary fluid fraction from the separation device 1 and an outer secondary fluid outlet 6 for discharging a condensables enriched & methane depleted secondary fluid fraction into a secondary discharge conduit 7. The secondary fluid fraction is fed via conduit 7 into a fluid fractionating column 8.

The present invention provides a process scheme for $H_2S$ recovery based on a cyclonic expansion and separation device 1, which is sold by Twister B. V. under the trademark Twister (Twister is a trademark owned by Twister B. V.). The cooling inside the cyclonic separation device 1 is established by accelerating the feed stream to a substantially transonic or supersonic velocity. At supersonic condition the pressure has dropped to typically a factor ¼ of the feed pressure, meanwhile the temperature drops to typically a factor ⅔ with respect to the feed temperature. The ratio of T-drop per unit P-drop for a given feed composition is determined with the isentropic efficiency of the expansion, which would be around the 85% for the cyclonic separation device. The isentropic efficiency expresses the frictional and heat losses occurring inside the device 1.

At the expanded state inside the cyclonic separation device 1, the majority of the $H_2S$ components are liquefied in a fine droplet dispersion and separated in separation chamber in which the fluid mixture is swirled and separated into a liquid enriched outer fraction and a gas enriched central fraction. The expansion ratio ($P/P_{feed}$) is chosen such that at least the specified $H_2S$ fraction is condensed into liquid inside the separator. Beyond the supersonic cyclone passage the flow inside the separation device 1 is split in a tubular separation chamber 9 into a $H_2S$ enriched flow (~30% of the total flow rate) and a $H_2S$ lean flow (approx. 70% of the total flow rate).

The $H_2S$ lean main flow is decelerated in a diffuser 10, resulting in a rise of pressure and temperature. The P-rise and the accompanied T-rise in the diffuser 10 is determined with both the isentropic efficiency of the expansion and the isentropic efficiency of the recompression. The isentropic efficiency of expansion, determines the remaining kinetic energy at the entrance of the diffuser, whereas the isentropic efficiency of recompression is determined with the losses inside the diffuser embodiment. The isentropic efficiency of recompression for a cyclonic separation device 1 is approx. 85%. The resulting outlet pressure of the $H_2S$ lean main flow is therefore lower than the feed pressure and about equal to the outlet pressure of the $H_2S$ enriched flow i.e. the column operating pressure.

For a cyclonic separator 1 based $H_2S$ scheme the optimisation of the $H_2S$ recovery is found in creating a deeper expansion in the cyclonic separator 1 (i.e. decrease of the ration $P/P_{feed}$) at which the $H_2S$ liquid is separated. The concentrated $H_2S$ flow is fed to the fractionating column 8 thereby reducing its size and/or reducing the duty of a reflux refrigerator 23 which is arranged in the upper outlet conduit 12 of the fractionating column 8.

FIG. 1. shows a flow scheme of a first embodiment of the method according to the present invention in which a $H_2S$ rich feed (typically $H_2S$=30 mole %) natural gas stream 13 flows through a feed conduit in which the natural gas stream is pre cooled in a first heat exchanger 14 by the cooled $H_2S$ lean product gas leaving the central outlet 5 of the cyclonic separator 1 (1$^{st}$ pre-cool step) and subsequently in a second heat exchanger 16 with the $H_2S$ lean product gas discharged by the upper outlet conduit 12 at the top of the fractionating column 8 ($2^{nd}$ pre-cool step). After the first pre-cool step free hydrocarbon liquid and water are removed with a bulk water separator 17. This first heat exchanger 14 reduces the fluid temperature of the natural gas stream to well above the hydrate formation temperature (~29° C. at 100 bar). Upstream of the second heat exchanger 16, liquefied H$_2$S is injected via a first reflux conduit 25 of which a part may evaporate. The remaining H$_2$S liquid will absorb the major part of the water vapour still present in the natural gas, thereby reducing the water content from ~1500 ppm/v (parts per million at a volumetric basis) at 100 bar and 29° C. to ~900 ppm/v at 100 bar and 29° C., thereby acting as a desiccant. The second heat exchanger 16 and an inlet refrigerator 18 arranged in the feed conduit 19 downstream of the second heat exchanger 16 will reduce the temperature fluid further to a T-range of −16 to −22° C. though typically −18° C. The liquids from the second heat exchanger 16, which contain predominantly H$_2$S are separated in a inlet separation vessel 20 before the cooled natural gas stream 21 is fed to the cyclonic separator 1. The H$_2$S rich liquid fraction discharged by the outer outlet 6 is fed via a conduit 22 to the fractionating column 8. The cooled natural gas stream 21 fed to the cyclonic separator 1 will contain about 20 mole % H$_2$S at 100 bar and −18° C.

In the embodiment of the method according to the invention depicted in FIG. 1 a stream of natural gas contaminated with hydrogen sulphide 13 is fed through a feed conduit 19 into a cyclonic separator 1 in which the feed gas is expanded with an expansion rate of factor 3 to 5 yielding a temperature of −70° C. at 33 bar resp. −90° C. at 20 bar. At this point the H$_2$S vapour fraction is ~4-7 mole %. With a proven separation efficiency of 92-95%, a product gas stream discharged by a central outlet 5 of the cyclonic separator 1 can be established containing 5-8 mole % H$_2$S. The H$_2$S lean primary flow (~70% of the total flow) leaving the central outlet 5 of the cyclonic separator 1 at ~−20° C., is used for pre-cooling the natural gas stream in the feed conduit 19 in the first heat exchanger 14. The H$_2$S enriched secondary flow (~30% of total flow) leaving through the outer outlet 6 of the cyclonic separator 1 at about −30° C. is used for pre-cooling the feed gas in the second heat exchanger 16 before it is fed to the fractionating column 8. The gaseous components of the secondary H$_2$S enriched fluid fraction discharged by the outer outlet 6 of the cyclonic separator 1 (predominantly methane) will pass the lower trays of the fractionating column 8 together with the H$_2$S vapour. The overhead gas discharged from the upper end of the fractionating column 8, containing methane and H$_2$S, is cooled down in a reflux refrigerator 23 to temperatures in the range of −25° to −35° C., typically to about −30° C. The cooled reflux fluid discharged by the reflux refrigerator is separated in a reflux separation vessel 24 and a first major fraction of the liquids discharged from the bottom of the reflux refrigeration vessel are returned via a first reflux conduit 25 to the feed conduit 19 near the inlet of the second heat exchanger 16 and a minor part is refluxed through a second reflux conduit 26 to the fractionating column 8. The reflux partition can range from 70%/30% to 100%/0% though is typical 95%/5%.

For a given top temperature of the overhead gas, the cooling duty of the reflux refrigerator 23 is primarily determined by the required H$_2$S vapour fraction of the produced gas leaving the reflux separation vessel 24 and secondarily determined by the required duty of the second heat exchanger 16 in order to obtain the required H$_2$S vapour fraction of the produced gas stream leaving the cyclonic separator 1. The reboiler duty of the fractionating column 8 determines the remaining methane fraction in the liquid stream H$_2$S, which is produced as bottom product 27. The dissolved methane fraction in the bottom product should be as low as possible. However the reboiler duty also determines the H$_2$S vapour stream leaving the top of the column and therefore the maximum amount of liquid H$_2$S reflux for a given chiller duty. Depending on the column operating pressure the reboiler temperature is chosen between the 40 and 80° C. though typically at 60° C.

For a low temperature H$_2$S recovery scheme the costs of the refrigerators 18 and 23 are leading in the overall economic feasibility. Conventional cooling schemes require a cooling duty of ~3 MW/10$^6$ (n)m$^3$/day for an operating temperature of −30° C. of a reflux chiller. Applying a Coefficient of Performance of $COP_{REAL}=Q_{cooling}/W_{compressor}=~1.55$ this would be similar to a propane compressor duty of ~1.9 MW/10$^6$ (n)m$^3$/day. Assuming an ambient T of 25° C., and an approach temperature (ΔT) of both the condenser and evaporator of 10° C., the ideal or Carnot COP (Coefficient Of Performance) of the reflux chiller of the IFP scheme would be:

$$COP_{CARNOT}=T_{evaporator}/(T_{condensor}-T_{evaporator})=233/(308-233)=3.1 \rightarrow \sim COP_{REAL}=1.55$$

Application of the method according to the present invention will result in a H$_2$S fraction of 13% in the gas export, such that the overall cooling duty can be reduced to ~1.7 MW/10$^6$ (n)m$^3$/day of which ~1.2 MW cooling is required for the inlet chiller and ~0.5 MW for the reflux chiller.

Moreover the inlet chiller works at a process temperature of 2° C. yielding a Carnot COP of:

$$COP_{CARNOT}=T_{evaporator}/(T_{condensor}-T_{evaporator})=265/(308-265)=6.2 \rightarrow \sim COP_{REAL}=3.1$$

Therefore the total mechanical duty of the chillers as mentioned in the present invention is:

$$1.2 \text{ MW}/3.1+0.5 \text{ MW}/1.55=0.71 \text{ MW}/10^6 \text{ (n)m}^3/\text{day}.$$

Calculation have indicated that by applying the low temperature H$_2$S recovery scheme of the invention as shown in FIG. 1, the total cooling duty can be reduced with 48% which equals a reduction of 60% of the mechanical duty of the chiller for a similar H$_2$S recovery. Alternatively, for the same chiller duty the H$_2$S content can be lowered with 5 mole %.

FIG. 2 depicts a flow scheme of a second embodiment of the method according to the invention, which is largely similar to the flow scheme shown in FIG. 1 and in which similar components are identified by similar reference numerals, but wherein the H$_2$S enriched fluid fraction discharged from the outer outlet 6 of the cyclonic separator 1 is discharged by a conduit 30 directly into the fractionating column 8.

Figure 3:
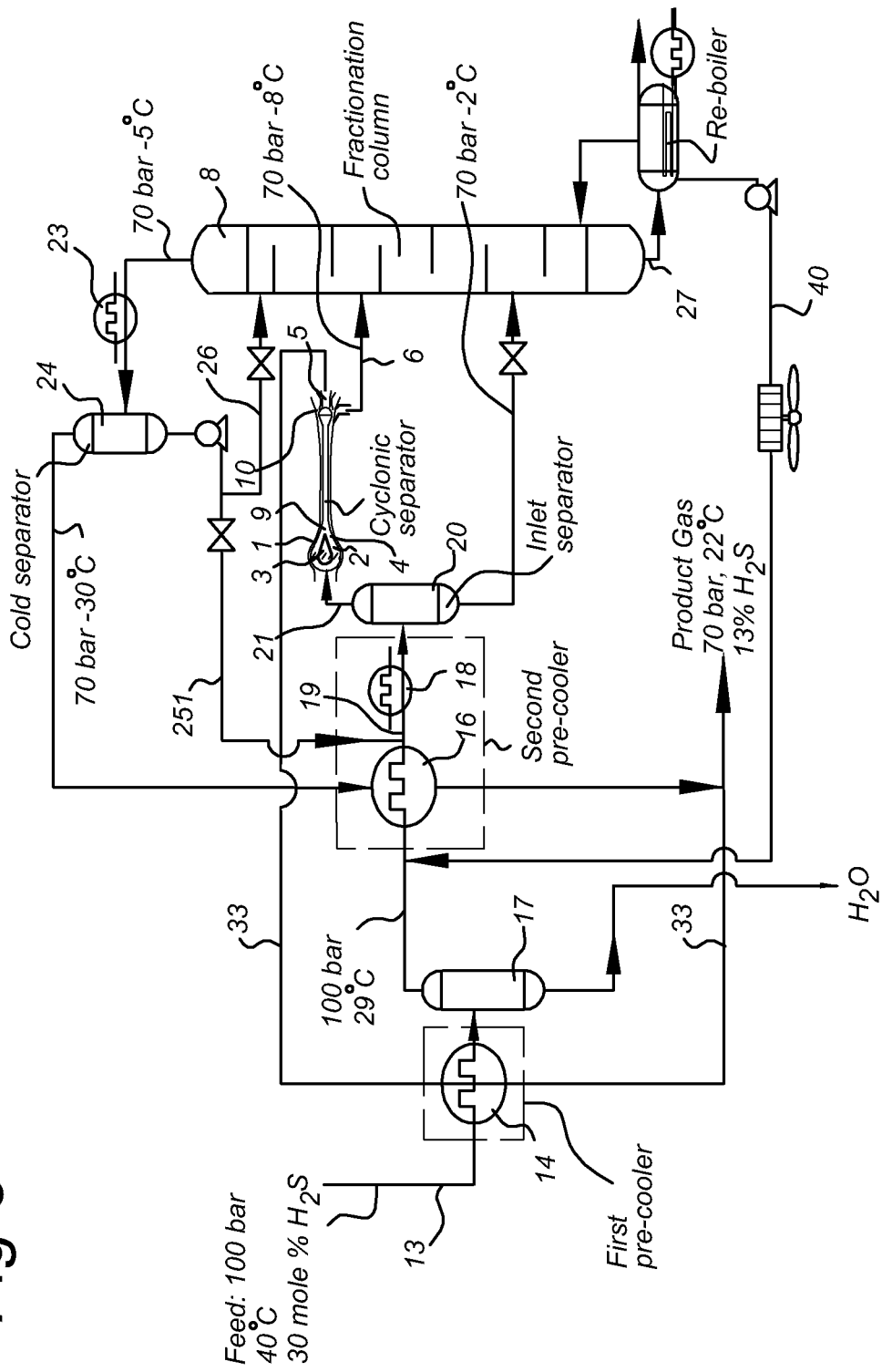
FIG. 3 depicts a flow scheme of a third embodiment of the method according to the invention.

FIG. 3 depicts a flow scheme of a third embodiment of the method according to the invention, which is largely similar to the flow scheme shown in FIG. 2 and in which similar components are identified by similar reference numerals, but wherein the first reflux conduit 251 is connected in the feed conduit 19 between the outlet of the second heat exchanger 16 and the inlet of the refrigerator 18.

Advantageously, a first H2S reflux from conduit 251 from the cold top of the fractionation column 8 is returned to the cooled feed stream from the second heat exchanger 16. This first H2S reflux which is relatively dry and relatively cold can be used beneficially for water absorption in the cold part of the feed gas.

Additionally, a reflux conduit 40 is arranged as conduit between the reboiler and the inlet of the second heat exchanger 16 for introduction of bottom product of a liquid H2S stream 27 that is collected in the reboiler, into the feed inlet at ~29° C.

Advantageously, the bottom product of a liquid H2S stream 27 is returned as a second additional H2S reflux from the warm bottom of the fractionation column 8 to the feed inlet at ~29° C. This second H2S reflux which is relatively rich in water and relatively warm can be used beneficially for water absorption in the warm part of the feed gas.

Figure 4:
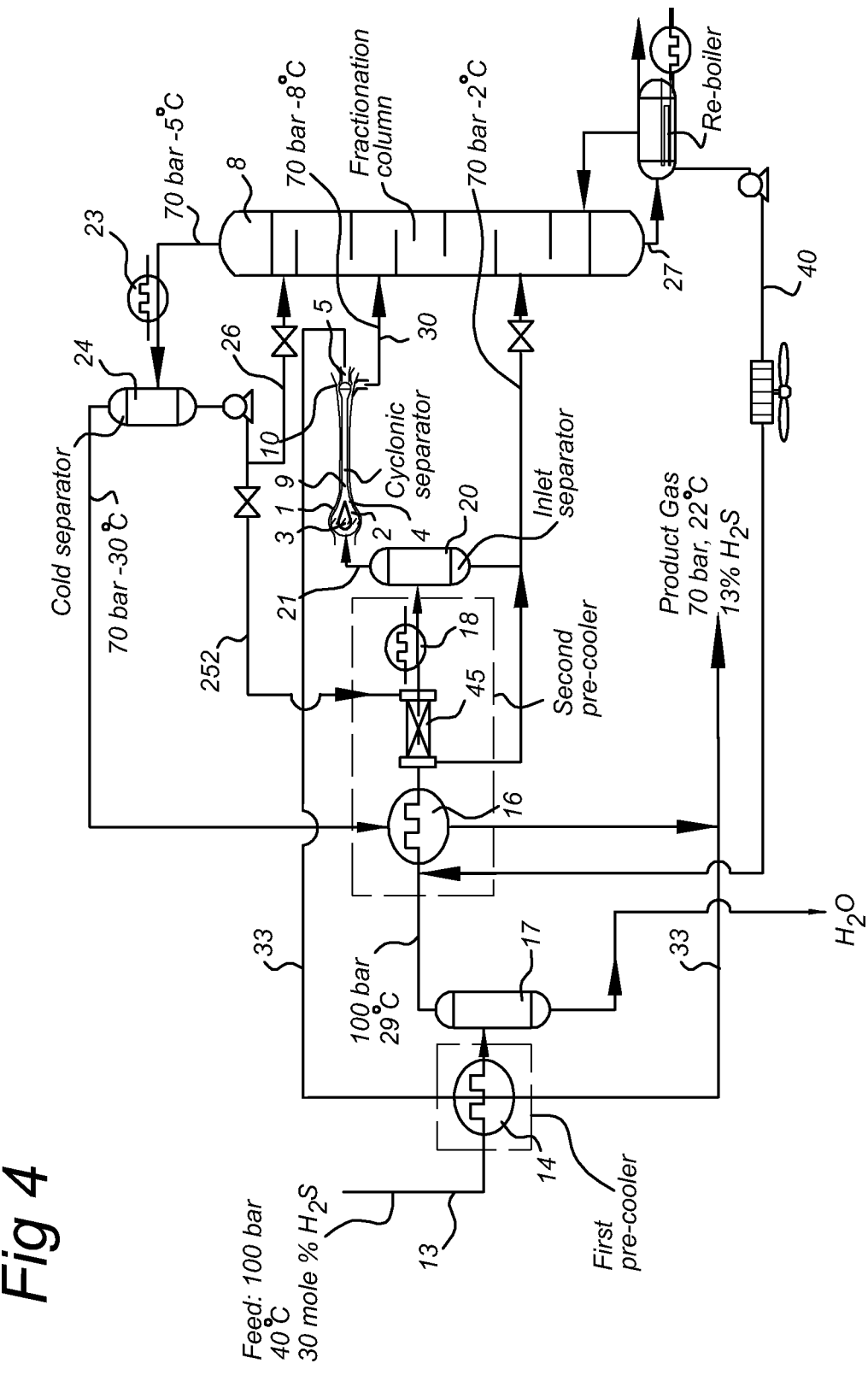
FIG. 4 depicts a flow scheme of a fourth embodiment of the method according to the invention.

FIG. 4 depicts a flow scheme of a fourth embodiment of the method according to the invention, which is largely similar to the flow scheme shown in FIG. 2 or FIG. 3 and in which similar components are identified by similar reference numerals, but wherein the second pre-cooler comprises the second heat exchanger 16, the refrigerator 18 and an in-line gas-liquid contactor 45. The in-line gas-liquid contactor 45 is arranged between the outlet of the second heat exchanger for receiving cooled feed gas at an gas stream inlet. An gas outlet of the contactor is connected to the feed inlet of the refrigerator 18. The first reflux conduit 252 is connected to a reflux inlet of the in-line gas-liquid contactor 45. The inline gas-liquid contactor 45 can be either operated co-currently or counter currently, though preferably counter currently.

The in-line gas-liquid contactor is arranged for improving contact between the cooled feed gas from the second heat exchanger 16 and the liquid H2S reflux from the reflux separation vessel 24 so as to enhance water absorption by the reflux from the feed gas. An outlet for (H2S containing) liquid of the in-line gas-liquid contactor 45 is connected to a lower region (at relatively high temperature) of the fractionating column 8, to feed the H2S containing liquid of the in-line gas-liquid contactor 45 to the fractionating column.

In an embodiment, the outlet for liquid of the in-line gas-liquid contactor is connected to the liquid outlet line of the inlet separation vessel 20.

Advantageously, the application of the in-line gas-liquid contactor 45 allows to reduce the water content of the feed gas by a more efficient interaction between the gas stream and the stream of liquid reflux.

Additionally, as described above with reference to FIG. 3, the third reflux conduit 40 is arranged as conduit between the reboiler and the inlet of the second heat exchanger 16 to return bottom product 27 that is collected in the reboiler into the feed inlet at ~29° C.

It is noted that the concept of using in-line gas-liquid contactors can be extended by a replacement of the fractionation column itself by one or more in-line gas-liquid contactors.

Moreover, a further in-line gas-liquid contactor may be used in any of the above process schemes for introducing a H2S reflux stream as water absorbing fluid at some point in the feed gas stream.

It will be understood that the additional embodiments presented in the description of FIGS. 3 and 4 are also applicable to the flow scheme described in FIG. 1.

The invention claimed is:

1. A method for removing hydrogen sulphide from a natural gas stream comprising methane and hydrogen sulphide, the method comprising:
   cooling the natural gas stream in a heat exchanger assembly;
   feeding at least part of the cooled natural gas stream through a feed conduit into a cyclonic expansion and separation device in which the cooled natural gas stream is expanded in a nozzle and thereby further cooled to a temperature and pressure below the dew point of hydrogen sulphide and is separated by inducing the cooled natural gas stream to swirl in a tubular separation chamber thereby inducing centrifugal forces to separate the cooled natural gas stream into a cooled low density fluid fraction, which is hydrogen sulphide depleted and methane enriched, and a cooled high density fluid fraction which is hydrogen sulphide enriched and methane depleted;
   feeding the cooled low density fluid fraction to a product gas conduit which is connected to the heat exchanger assembly for cooling the natural gas stream fed to the cyclonic expansion and separation device; and
   feeding the cooled high density fluid fraction to a fractionating column for further separation, and wherein the fractionating column is configured to separate the high density fluid fraction discharged by the cyclonic expansion and separation device into a hydrogen sulphide enriched and methane depleted bottom fraction and a hydrogen sulphide depleted and methane enriched upper fraction, which upper fraction is discharged from the upper part of the fractionating column into a reflux conduit in which a reflux refrigerator is arranged and which discharges the cooled upper fraction into a reflux separation vessel in which the cooled upper fraction is separated into:
   a) a cooled substantially gaseous hydrogen sulphide depleted and methane enriched fraction, which is mixed with the cooled low density fluid fraction fed to the product gas conduit after being discharged by the cyclonic expansion and separation device, wherein the mixing occurs downstream from the heat exchanger assembly, and
   b) a cooled hydrogen sulphide enriched and methane depleted substantially liquid fluid fraction, which is re-circulated into the feed conduit;
   wherein the feed conduit includes a water separation vessel; and
   wherein the heat exchanger assembly includes:
   a first heat exchanger in which the natural gas stream is cooled by the cooled low density fluid fraction flowing through the product gas conduit to a temperature below the dew point of said natural gas stream, from which first heat exchanger the cooled natural gas enters the water separation vessel,
   a second heat exchanger in which the natural gas stream discharged by the water separation vessel is cooled by the cooled substantially gaseous hydrogen sulphide depleted and methane enriched fraction discharged by the reflux separation vessel, and
   an inlet refrigerator cooling the natural gas stream from the second heat exchanger;
   wherein the feed conduit further includes a gas liquid separation vessel separating natural gas from the inlet refrigerator into a gas separated stream and a liquid separated stream;
   wherein the gas separated stream is fed to the cyclonic expansion and separation device as the at least part of the cooled natural gas stream, and the liquid separated stream is fed into the fractionating column;
   wherein the cooled hydrogen sulphide enriched and methane depleted substantially liquid fluid fraction is injected into the feed conduit upstream of the second heat exchanger and downstream of the water separation vessel.

2. The method of claim 1, wherein the inlet refrigerator cools the natural gas stream fed to the cyclonic expansion and separation device such that the natural gas stream has a reduced water content and a temperature between 5 and −25 degrees Celsius.

3. The method of claim 1, wherein the cooled hydrogen sulphide enriched and methane depleted substantially liquid fluid fraction desiccates the cooled natural gas stream flowing through the feed conduit.

4. The method of claim 1, wherein the cyclonic expansion and separation device comprises:
   a) an assembly of swirl imparting vanes for imposing a swirling motion on the natural gas stream, which vanes are arranged upstream of the nozzle in which the natural gas stream is accelerated to a substantially supersonic velocity and expanded and thereby further cooled such that centrifugal forces separate the swirling fluid stream in the tubular separation chamber, which is arranged downstream of the nozzle, into the low and high density fluid fractions.

5. The method of claim 4, wherein cyclonic expansion and separation device comprises the assembly of swirl imparting vanes which protrude in an at least partially radial direction from a torpedo shaped central body upstream of the nozzle, which body has a larger outer diameter than the inner diameter of the nozzle.

6. A system for removing hydrogen sulphide from a natural gas stream that contains methane and hydrogen sulphide, the system comprising:
   a heat exchanger assembly for cooling the natural gas stream;
   a cyclonic expansion separation device which is connected to an outlet of the heat exchanger assembly via a feed conduit, which device comprises a nozzle in which the cooled natural gas stream is expanded and thereby further cooled to a temperature and pressure below the dew point of hydrogen sulphide and a tubular separation chamber in which the cooled natural gas stream is induced to swirl thereby inducing centrifugal forces to separate the cooled natural gas stream into a cooled low density fluid fraction, which is hydrogen sulphide depleted and methane enriched, and a cooled high density fluid fraction, which is hydrogen sulphide enriched and methane depleted;
   a product gas conduit into which the cooled low density fluid fraction is fed, which product gas conduit is connected to the heat exchanger assembly for cooling the natural gas stream fed to the cyclonic expansion and separation device; and
   a fractionating column in which the cooled high density fluid fraction is fed for further separation, and wherein the fractionating column is configured to separate the high density fluid fraction discharged by the cyclonic expansion and separation device into a hydrogen sulphide enriched and methane depleted bottom fraction and a hydrogen sulphide depleted and methane enriched upper fraction, the upper fraction is discharged from the upper part of the fractionating column into a reflux conduit in which a reflux refrigerator is arranged and the reflux conduit discharges the cooled upper fraction into a reflux separation vessel in which the cooled upper fraction is separated into:
      a) a cooled substantially gaseous hydrogen sulphide depleted and methane enriched fraction, which is mixed with the cooled low density fluid fraction fed to the product gas conduit after being discharged by the cyclonic expansion and separation device, wherein the mixing occurs downstream from the heat exchanger assembly, and
      b) a cooled hydrogen sulphide enriched and methane depleted substantially liquid fluid fraction, which is re-circulated into the feed conduit;
   wherein the feed conduit includes a water separation vessel; and
   wherein the heat exchanger assembly further includes:
      a first heat exchanger in which the natural gas stream is cooled by the cooled low density fluid fraction flowing through the product gas conduit to a temperature below the dew point of said natural gas stream, from which first heat exchanger the cooled natural gas enters the water separation vessel,
      a second heat exchanger in which the natural gas stream discharged by the water separation vessel is cooled by the cooled substantially gaseous hydrogen sulphide depleted and methane enriched fraction discharged by the reflux separation vessel, and
      an inlet refrigerator cooling the natural gas stream from the second heat exchanger;
   wherein the feed conduit further includes a gas liquid separation vessel separating natural gas from the inlet refrigerator into a gas separated stream and a liquid separated stream;
   wherein the gas separated stream is fed to the cyclonic expansion and separation device as the at least part of the cooled natural gas stream, and the liquid separated stream is fed into the fractionating column;
   wherein the cooled hydrogen sulphide enriched and methane depleted substantially liquid fluid fraction is injected into the feed conduit upstream of the second heat exchanger and downstream of the water separation vessel.

7. The system of claim 6, wherein the inlet refrigerator cools the natural gas stream fed to the cyclonic expansion and separation device such that the natural gas stream has a reduced water content and a temperature between 5 and −25 degrees Celsius.

8. The system of claim 6, wherein the cooled hydrogen sulphide enriched and methane depleted substantially liquid fluid fraction desiccates the cooled natural gas stream flowing through the feed conduit.

9. The system of claim 6, wherein the cyclonic expansion and separation device comprises:
   an assembly of swirl imparting vanes for imposing a swirling motion on the natural gas stream, which vanes are arranged upstream of the nozzle in which the natural gas stream is accelerated to a substantially supersonic velocity and expanded and thereby further cooled such that centrifugal forces separate the swirling fluid stream in the tubular separation chamber, which is arranged downstream of the nozzle, into the low and high density fluid fractions.

10. The system of claim 9, wherein cyclonic expansion and separation device comprises the assembly of swirl imparting vanes which protrude in an at least partially radial direction from a torpedo shaped central body upstream of the nozzle, which body has a larger outer diameter than the inner diameter of the nozzle.

* * * * *